United States Patent
Willer

(10) Patent No.: US 6,624,745 B1
(45) Date of Patent: Sep. 23, 2003

(54) LOW PASS FILTER FOR A UNIVERSAL HOME NETWORK ON A CUSTOMER PREMISES EUROPEAN INSTALLATION BUS

(75) Inventor: Bernd Willer, Moosburg (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/573,392

(22) Filed: May 18, 2000

(51) Int. Cl.[7] ............................................. H04M 11/04
(52) U.S. Cl. ........................ 340/310.01; 340/310.03; 340/310.07; 375/259; 709/223
(58) Field of Search ..................... 340/310.01–310.06, 340/310.07, 310.08; 375/220, 259, 258; 709/208, 220, 223, 250

(56) References Cited

U.S. PATENT DOCUMENTS

| | | | |
|---|---|---|---|
| 4,075,675 A | * 2/1978 | Burkett et al. | ................. 361/48 |
| 4,348,657 A | * 9/1982 | Merkel | ................... 340/310.03 |
| 5,089,974 A | * 2/1992 | Demeyer et al. | ...... 340/310.02 |
| 5,434,863 A | * 7/1995 | Onishi et al. | ................ 370/402 |

* cited by examiner

Primary Examiner—Donnie L. Crosland
(74) Attorney, Agent, or Firm—Manelli Denison & Selter PLLC; Leon R. Turkevich

(57) ABSTRACT

A low pass filter is configured for coupling home PNA network signals to a customer premises system having a two-wire European Installation Bus. The low pass filter uses an inductor having terminal ends connected to windings and configured in a non-compensating mode for generation of sufficient inductance for low pass filtering of the home PNA network signals from high frequency components of EIB signals generated by EIB bus coupling units. Use of an inductor having terminal ends connected to windings in a non-compensating mode enables the use of a smaller inductor core, such as a common mode choke or a ferrite bead toroid, that can fit within an EIB bus connector. Hence, existing EIB bus connectors can be replaced with improved coupling units having low pass filters that enable coupling of home PNA signals to the EIB bus. In addition, use of a toroid having windings in the non-compensating mode creates a closed loop within the toroid for flux induced by the windings, minimizing electromagnetic interference. Finally, use of an improved coupling unit having a low pass filter isolates capacitive influences from EIB bus coupling units, ensuring that the home PNA signals are not distorted by the EIB bus coupling units.

18 Claims, 3 Drawing Sheets

LOW PASS FILTER FOR A UNIVERSAL HOME NETWORK ON A CUSTOMER PREMISES EUROPEAN INSTALLATION BUS

BACKGROUND OF THE INVENTION

1. Field of the Invention

The present invention relates to network interfacing, and more particularly to methods and systems for controlling transmission of data between network stations connected to a European Installation Bus (EIB).

2. Background Art

Local area networks use a network cable or other media to link stations on the network. Each local area network architecture uses a media access control (MAC) enabling network interface cards at each station to share access to the media.

Conventional local area network architectures use a media access controller operating according to half-duplex or full duplex Ethernet (ANSI/IEEE standard 802.3) protocol using a prescribed network medium, such as 10BaseT. Newer operating systems require that a network station be able to detect the presence of the network. In an Ethernet 10BaseT environment, the network is detected by the transmission of a link pulse by the physical layer (PHY) transceiver. The periodic link pulse on the 10BaseT media is detected by a PHY receiver, which determines the presence of another network station transmitting on the network medium based on detection of the periodic link pulses. Hence, a PHY transceiver at station A is able to detect the presence of station B, without the transmission or reception of data packets, by the reception of link pulses on the 10BaseT medium from the PHY transmitter at station B.

Efforts are underway to develop an architecture that enables computers to be linked together using conventional twisted pair telephone lines instead of established local area network media such as 10BaseT. Such an arrangement, referred to herein as a home network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air-conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak to peak voltage on the order of 10 to 20 millivolts, whereas network signals from another network station may have a value on the order of one to two volts. Hence, the amplitude and shape of a received pulse may be so distorted that recovery of a transmitted clock or transmit data from the received pulse becomes substantially difficult.

Another transmission scheme is the use of a 2-wire European Installation Bus (EIB) according to EN50090 and DIN VDE 0829 established by the European Installation Bus Association. The EIB system is configured for transmission of 10 kbps data signals, driven by a 24 V DC power supply, between appliances for control of building systems such as lighting and Venetian blind control, heating and air-conditioning control, and management of power outlet interfaces. The EIB bus is configured for connecting up to 64 devices per line via respective bus connectors, each line having various bus structures without a termination resistor.

Numerous problems are encountered if one attempts to supply home PNA network signals in a customer premises having two-wire EIB bus. Capacitive influences on the two wire EIB bus caused by EIB devices and/or end wiring may adversely affect the home PNA signals, limiting the effective transmission distance between two network stations. In addition, high frequency harmonics of the 10 kbps EIB data signals may interfere with the home PNA signals. A substantially large filter would be impractical for implementation within installed bus connectors having a relatively small size in relatively small wall holes having a diameter of about 68 millimeters. In addition, electromagnetic interference caused by the filter elements needs to be avoided.

SUMMARY OF THE INVENTION

There is need for an arrangement for interconnecting computer end stations in a network configured for sending EIB signals on a two-wire bus, using a low pass filter having minimal electromagnetic interference and a sufficiently small size for placement within an EIB coupling unit.

There is also a need for separating home PNA signals from EIB harmonic signals for implementation of a network on an EIB bus, using a low pass filter having a small size and minimal electromagnetic interference.

These and other needs are attained by the present invention, where a low pass filter configured for coupling home PNA network signals to a customer premises system having a two-wire European Installation Bus uses an inductor having terminal ends connected to windings and configured in a non-compensating mode for generation of sufficient inductance for low pass filtering of EIB signals from high frequency components of home PNA network signals. Use of an inductor having terminal ends connected to windings in a non-compensating mode enables the use of a smaller inductor core, such as a common mode choke or a ferrite bead toroid, that can fit within an EIB bus connector. Hence, existing EIB bus connectors can be replaced with improved coupling units having low pass filters that enable coupling of home PNA signals to the EIB bus. In addition, use of a toroid having windings in the non-compensating mode creates a closed loop within the toroid for flux induced by the windings, minimizing electromagnetic interference. Finally, use of an improved coupling units having a low pass filter isolates capacitive influences from EIB bus coupling units, ensuring that the home PNA signals are not distorted by the EIB bus coupling units.

One aspect of the present invention provides a method of implementing a local area network in a customer premises having a European Installation Bus (EIB) and two-wire terminals configured for coupling respective EIB bus coupling units to the EIB bus. The method includes connecting to at least one of the two-wire terminals a coupling unit. The coupling unit includes a first two-wire connection, for connecting the corresponding one two-wire terminal to a network node configured for transmitting and receiving local area network signals, and a low pass filter. The low pass filter is configured for passing an EIB signal and rejecting the local area network signal and harmonics of the EIB signal, and includes first and second windings each having first and second terminal ends. The step of connecting the coupling unit includes connecting the first terminal ends of the first and second windings to the first two-wire connection. The step of connecting the coupling unit also includes connecting the second terminal ends of the first and second windings to a corresponding two-wire terminal connector for a corresponding one of the EIB bus coupling units, the windings configured for generating an electromagnetic flux in a same direction induced by any one of the EIB signal and the local area network signals. The connection of the first and second terminal ends of the first and second windings in a configuration for generating an electromagnetic flux in the same direction provides the inductivity needed for the low pass filter using a substantially small inductor device, such as a ferrite bead toroid having a diameter of about 1 cm. Hence, a low pass filter can be implemented for filtering the local area network signal and harmonics of the EIB signal at a sufficiently small size to be implemented within a coupling unit for the EIB bus.

Another aspect of the present invention provides a coupling unit configured for connecting a European Installation Bus (EIB) coupling unit to a two-wire terminal of an EIB bus configured for transmission of an EIB signal. The coupling unit includes a first two-wire connector configured for connecting the two-wire terminal to a two-wire network node terminal, and a low pass filter. The low pass filter is configured for passing the EIB signal between the two-wire terminal and an EIB bus coupling unit two-wire terminal, and rejecting a local area network signal on the two-wire terminal and harmonics of the EIB signal. The low pass filter includes first and second windings each having first and second terminal ends, the first terminal ends of the first and second windings coupled to the first two-wire connector, the second terminal ends of the first and second windings connected to the EIB bus coupling unit two-wire terminal. The first and second windings and the first and second terminal ends are arranged for generating an electromagnetic flux, induced by any one of the EIB signal and the local area network signal, in a same direction.

Still another aspect of the present invention provides a computer network. The computer network includes a two-wire European Installation Bus (EIB) configured for transmission of an EIB signal between EIB bus coupling units connected at respective two-wire terminals, first and second network nodes configured for transmitting and receiving network signals, and coupling units. Each coupling unit is configured for connecting a corresponding network node and EIB bus coupling unit to a corresponding one of the two-wire terminals. Each coupling unit includes a first two-wire connector configured for connecting the corresponding two-wire terminal to the corresponding network node for transmission of the network signals on the EIB bus, and a low pass filter. The low pass filter is configured for passing the EIB signal between the corresponding two-wire terminal and the corresponding EIB bus coupling unit, and rejecting the network signals on the EIB bus and harmonics of the EIB signal. The low pass filter includes first and second windings each having first and second terminal ends, the first terminal ends of the first and second windings coupled to the corresponding two-wire connector, the second terminal ends of the first and second windings connected to the EIB bus coupling unit, the first and second windings and the first and second terminal ends arranged for generating an electromagnetic flux, induced by any one of the EIB signal and the network signals, in a same direction.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
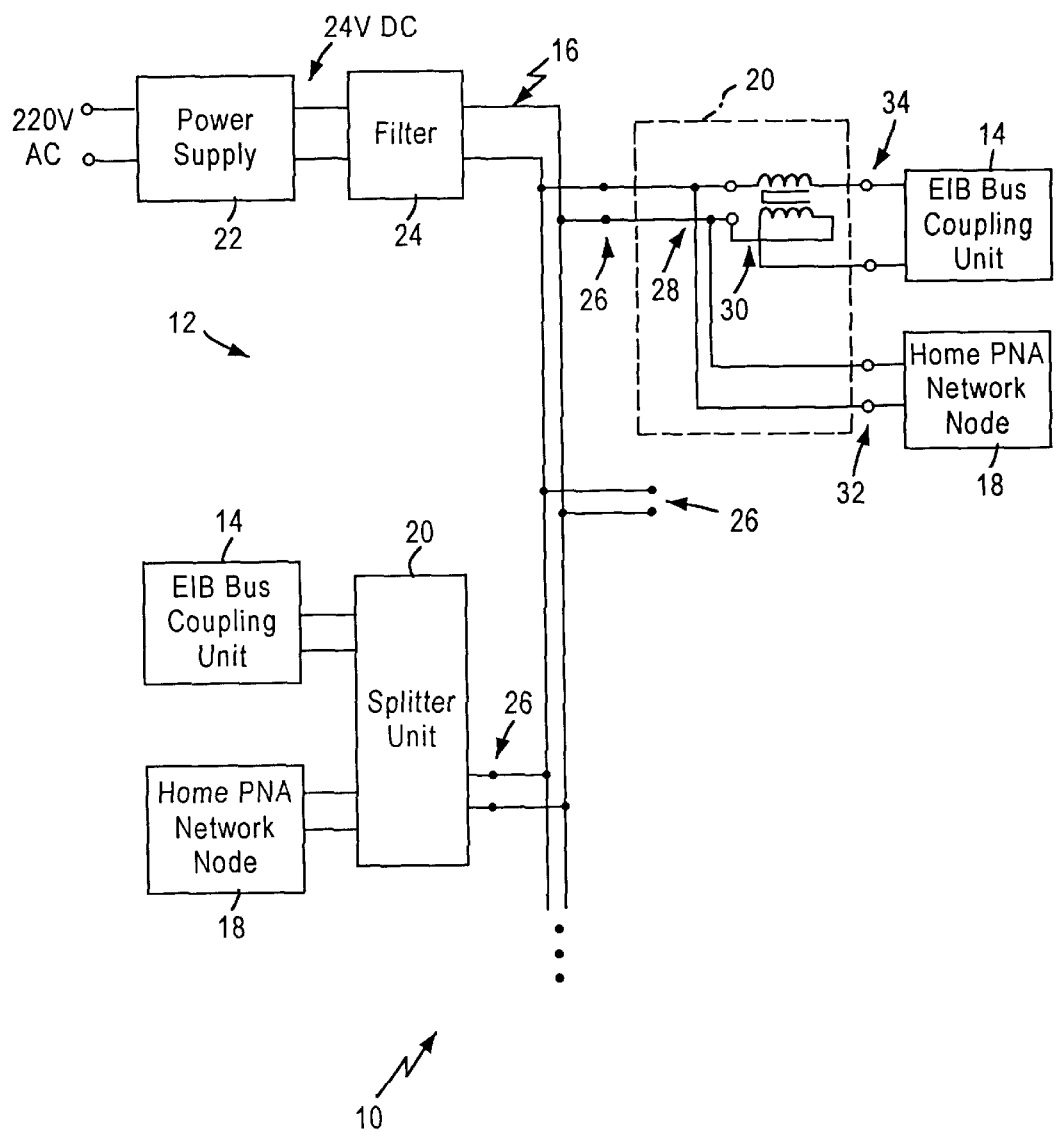
FIG. 1 is a block diagram illustrating a computer network implemented in a customer premises having an EIB bus according to an embodiment of the present invention.

FIG. 1 is a block diagram illustrating an Ethernet (IEEE 802.3) local area computer network 10 implemented in a customer premises network 12 using European Installation Bus (EIB) (also referred to as "EIB bus") based signals according to an embodiment of the present invention. As shown in FIG. 1, the customer premises network 12 includes end equipment units 14, also referred to as EIB bus coupling units, a two-wire EIB bus 16, network nodes 18, and splitter units 20 configured for connecting the EIB bus coupling units 14 and the network nodes 18 to the EIB bus 16. The customer premises network 12 also includes a 24 V DC power supply 22, and a conventional low pass filter 24 for isolating capacitive 10 influences by the power supply 22 and for isolating any noise signals that may be output by the power supply 22.

The network nodes 18 of the local area computer network 10, for example computer workstations, are configured for sending and receiving IEEE 802.3 type data packets according to the home PNA protocol specified by the Home Phone Network Alliance.

An important requirement of the two-wire EIB bus 16 is that the bus has no termination resistor, but rather remains open, similar to a two wire telephone line. The two-wire EIB bus 16 is configured for connecting up to 64EIB bus coupling units 14, hence numerous two wire terminals 26 may be positioned along the EIB bus 16 for connection of EIB bus coupling units.

Attempts to upgrade an existing customer premises network 12 to include network nodes 18 require that the home PNA signals transmitted by the added network nodes 18 do not interfere with the 10 kbps EIB signals. In addition, care must be taken to ensure that the EIB bus 16 provides the optimum transmission line characteristics to ensure that the home PNA signals can be reliably transmitted across a substantial distance, for example up to 100meters. Finally, any added components necessary to support the home PNA network nodes 18 should be of minimal size and cost, especially since existing connectors used to connect the EIB bus coupling unit 14 to a two wire connector 26 may need to be replaced.

According to the disclosed embodiment, the splitter units 20 are implemented as a replacement for existing connectors used to connect an EIB bus coupling unit 14 to the two wire connector 26. The splitter units 20, configured for connecting the EIB bus coupling unit 14 and the home PNA network node 18 to a corresponding two wire connector 26 of the EIB bus 16, include a first two wire connector 28 and a low pass filter 30. The first two wire connector 28 is configured for connecting the two wire terminal 26 to the corresponding home PNA network node 18 via a corresponding two wire network node terminal 32. The low pass filter 30 is configured for passing the EIB signal between the two wire terminal 26 and the EIB bus coupling unit 14 via an EIB bus coupling unit two-wire terminal 34, and rejecting the local area network signal (e.g., the home PNA signal). Hence, the EIB bus coupling unit 14 receives only the EIB bus signal, and does not encounter any interference from the home PNA signal.

In addition, the low pass filter 30 is configured for providing an optimum transmission line on the EIB bus 16 for the home PNA network signal. In particular, the low pass filter 30 isolates any capacitive influences by the EIB bus coupling unit 14, and rejects harmonics of the EIB signal output by the EIB bus coupling unit 14 onto the terminal 34, ensuring that the harmonics of the EIB signal do not interfere with the home PNA network signal transmitted on the EIB bus 16.

Another important consideration for the low pass filter 30 is that the low pass filter 30 has a minimal size and generates a minimal amount of electromagnetic interference (EMI) that may otherwise interfere with the EIB bus coupling unit 14 or the home PNA network node 18. Hence, there is a need for a low pass filter 30 having a sufficiently small size that they can be fitted within a conventional EIB connector used to connect the EIB bus coupling unit 14 to the EIB bus 16.

According to the disclosed embodiment, the low pass filter 30 includes windings to connect the EIB bus coupling unit two-wire terminal 34 to the two-wire terminal 26 in a configuration that ensures that the electromagnetic flux induced by the EIB signal and/or the home PNA local area network signal are aligned in the same direction. In particular, the low pass filter 30 is implemented by using a common mode choke in a non compensating manner, illustrated in FIG. 2, or a ferrite bead toroid, illustrated in FIG. 3, and connecting the ends of the windings to ensure the electromagnetic flux induced by the windings are in the same direction.

Figure 2:
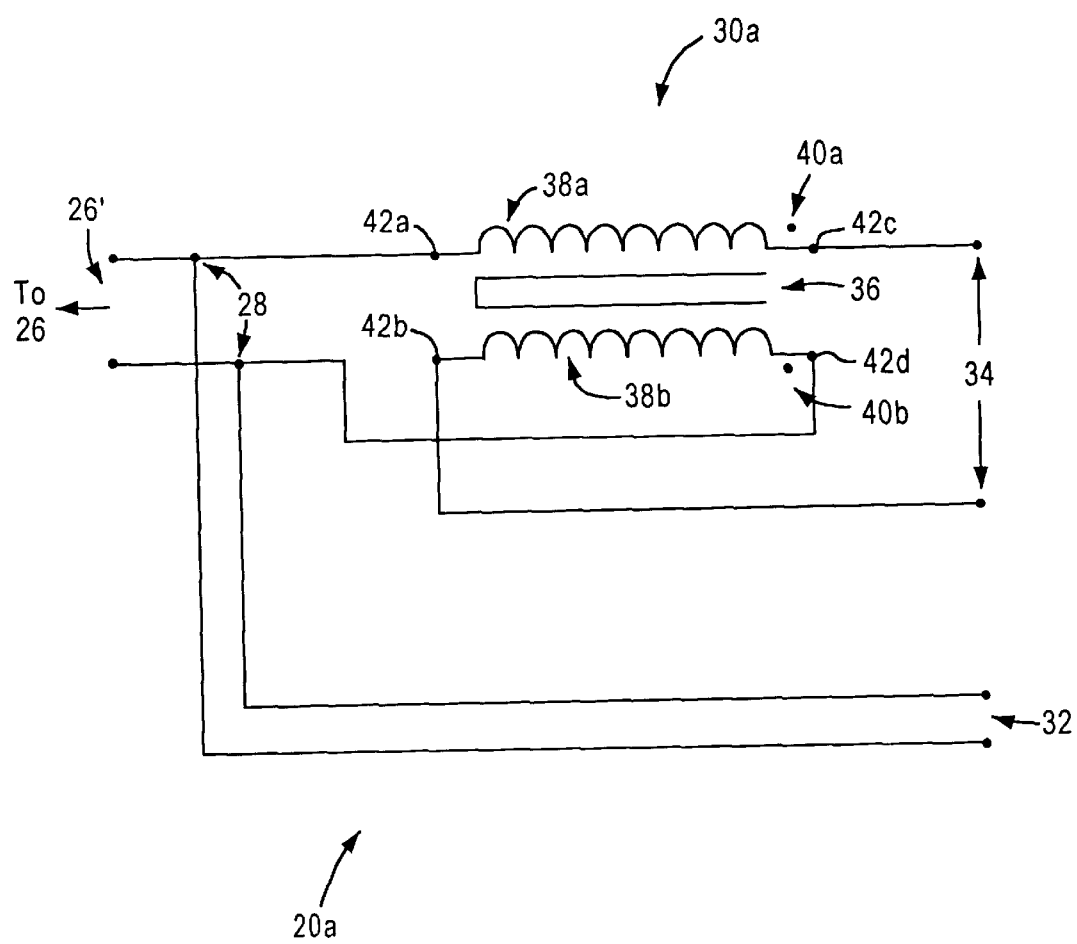
FIG. 2 is a diagram illustrating in detail the coupling unit of FIG. 1 according to an embodiment of the present invention.

FIG. 2 is a diagram illustrating in detail the splitter unit 20a according to one embodiment of the present invention. The splitter unit 20a includes the first two-wire connector configured for connecting the two wire terminal 26 (via a complementary two-wire terminal 26') to the two-wire network node terminal 32. The splitter unit 20a also includes a low pass filter 30a, implemented as a common mode choke 36 having windings 38a and 38b symmetrically arranged, as illustrated by the symmetric dots 40 according to the dot convention. Hence, the terminal ends 42 of the windings 38 are coupled to the first two-wire connector 28 and the EIB bus coupling unit two-wire terminal 34 in a manner that ensures that the electromagnetic flux induced by the windings 38 are generated in the same direction. Illustration of the alignment of the windings 38 is illustrated in further detail below with respect to FIG. 3.

Figure 3:
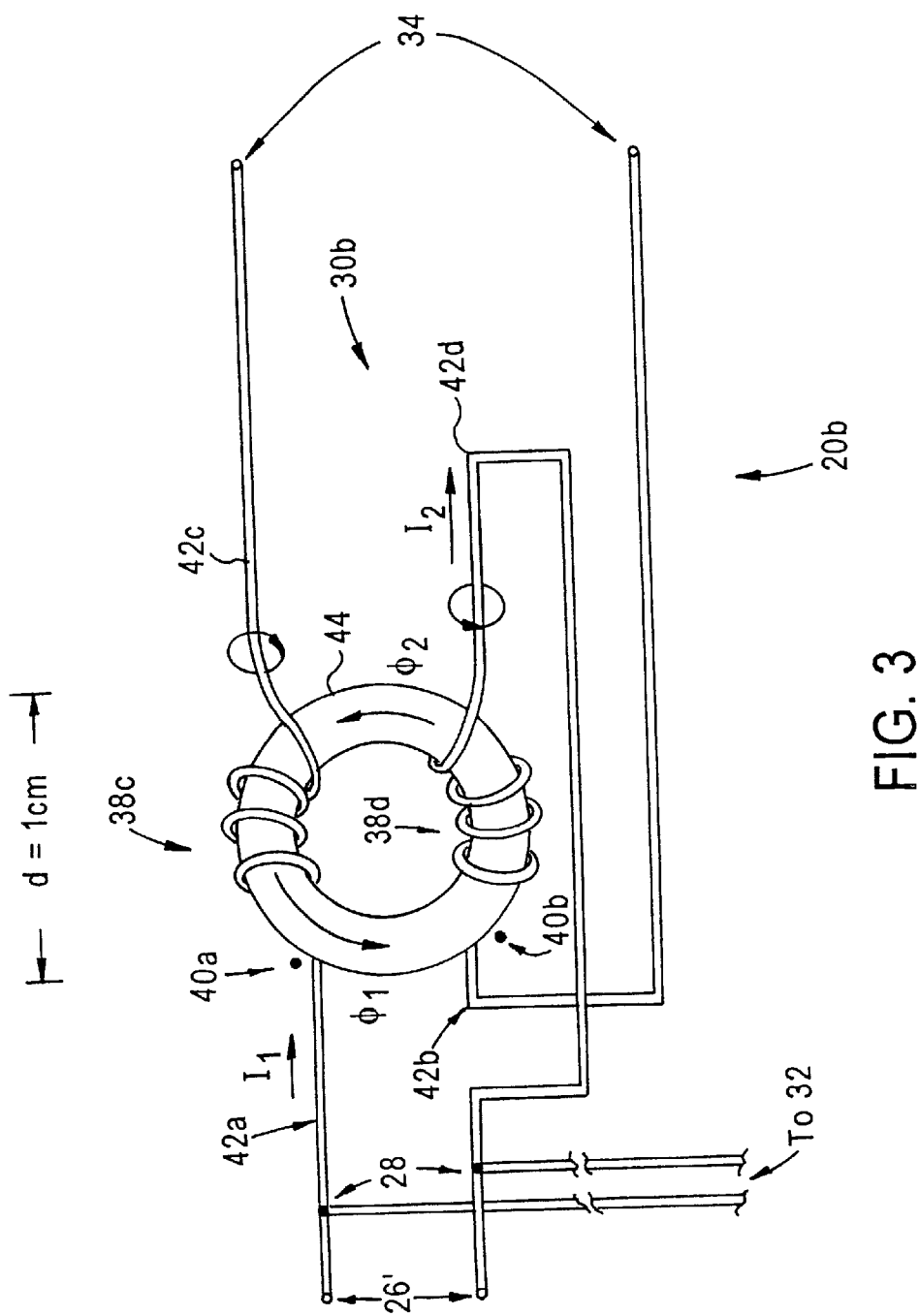
FIG. 3 is a diagram illustrating the coupling unit of FIG. 1 according to another embodiment of the present invention.

FIG. 3 is a diagram illustrating in detail the splitter unit 20b according to another embodiment of the present invention. The splitter unit 20b includes a low pass filter 30b having windings 38c and 38d wrapped around a toroid 44, for example a ferrite bead toroid, in a manner that enables respective induced flux paths Phi1 ($\Phi1$) and Phi2 (($\Phi2$) to be generated in the same direction. For example, assume that an input current I1 is input into the terminal end 42a and output from the terminal end 42c, creating the flux path Phi1 ($\Phi1$). Assuming the current I1 passes through a load (e.g., the EIB bus coupling unit 14) via the EIB bus coupling unit two-wire terminal 34, the current (now represented as current 12) enters the terminal end 42b and exits the terminal end 42d creating the second flux path Phi2 ($\Phi2$) in the same direction as the first flux path Phi1 ($\Phi1$). Hence, the addition of the flux results in the addition of the relative inductances of the two windings 38c and 38d, resulting in a substantially high impedance for the home PNA network signal. In addition, use of a toroid 44 eliminates the generation of any electromagnetic field, since the field lines are closed within the toroid, resulting in an absence of any magnetic poles.

Hence, use of a toroid with inverted windings, as illustrated in FIG. 3, results in an inductance of about 2×47microHenries to about 2×4.7milliHenries in a toroid having a diameter of about 1centimeter. Consequently, home PNA networks can be implemented on EIB bus is 16 simply by replacing an existing connector with an improved unit having a small conductor as illustrated in FIGS. 2 and 3.

While this invention has been described with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of implementing a local area network in a customer premises having a European Installation Bus (EIB) and two-wire terminals configured for coupling respective EIB bus coupling units to the EIB bus, the method comprising:

connecting to at least one of the two-wire terminals a splitter unit, the splitter unit having a first two-wire connection for connecting the corresponding one two-wire terminal to a network node configured for transmitting and receiving local area network signals, and a low pass filter configured for passing an EIB signal and rejecting the local area network signal and harmonics of the EIB signal, the low pass filter having first and second windings each having first and second terminal ends, the connecting step including:
   (1) connecting the first terminal ends of the first and second windings to the first two-wire connection, and
   (2) connecting the second terminal ends of the first and second windings to a corresponding two-wire terminal connector for a corresponding one of the EIB bus coupling units, the windings configured for generating an electromagnetic flux in a same direction induced by any one of the EIB signal and the local area network signals.

2. The method of claim 1, further comprising:
   connecting the one EIB bus coupling unit to the corresponding two-wire terminal connector for transmission and reception of the EIB signal on the EIB bus via the low pass filter; and
   connecting the network node to the first two-wire connection for transmission and reception of the local area network signal on the EIB bus.

3. The method of claim 1, wherein the step of connecting the splitter unit includes arranging the first and second windings around a toroid.

4. The method of claim 3, wherein the toroid is a ferrite bead toroid having a diameter of about 1cm.

5. The method of claim 4, wherein the arranging step includes configuring the low pass filter to isolate from the EIB bus capacitive influences induced by the EIB bus coupling units.

6. The method of claim 1, wherein the step of connecting the splitter unit includes arranging the first and second windings around a common mode choke in a non compensating configuration.

7. The method of claim 6, wherein the arranging step includes configuring the low pass filter to isolate from the EIB bus capacitive influences induced by the EIB bus coupling units.

8. The method of claim 1, further comprising concurrently transmitting the EIB signal on the EIB bus with the local area network signal.

9. A splitter unit configured for connecting a European Installation Bus (EIB) coupling unit to a two-wire terminal of an EIB bus configured for transmission of an EIB signal, the splitter unit comprising:

a first two-wire connector configured for connecting the two-wire terminal to a two-wire network node terminal; and a low pass filter configured for passing the EIB signal between the two-wire terminal and an EIB bus coupling unit two-wire terminal, and rejecting a local area network signal on the two-wire terminal and harmonics of the EIB signal, the low pass filter including first and second windings each having first and second terminal ends, the first terminal ends of the first and second windings coupled to the first two-wire connector, the second terminal ends of the first and second windings connected to the EIB bus coupling unit two-wire terminal, the first and second windings and the first and second terminal ends arranged for generating an electromagnetic flux, induced by any one of the EIB signal and the local area network signal, in a same direction.

10. The splitter unit of claim 9, wherein the low pass filter includes a ferrite bead toroid having wrapped thereon the first and second windings, the ferrite bead toroid configured for transporting the electromagnetic flux generated by the first and second windings in a closed loop.

11. The splitter unit of claim 10, wherein the ferrite bead toroid has a diameter of about 1cm.

12. The splitter unit of claim 9, wherein the low pass filter includes a common mode choke having the first and second windings arranged in a non-compensating configuration.

13. The splitter unit of claim 9, wherein the low pass filter is configured for minimizing capacitive influences encountered by the local area network signal on the EIB bus.

14. A computer network comprising:

a two-wire European Installation Bus (EIB) configured for transmission of an EIB signal between EIB bus coupling units connected at respective two-wire terminals;

first and second network nodes configured for transmitting and receiving network signals; and splitter units, each configured for connecting a corresponding network node and EIB bus coupling unit to a corresponding one of the two-wire terminals, each splitter unit including:

(1) a first two-wire connector configured for connecting the corresponding two-wire terminal to the corresponding network node for transmission of the network signals on the EIB bus, and (2) a low pass filter configured for passing the EIB signal between the corresponding two-wire terminal and the corresponding EIB bus coupling unit, and rejecting the network signals on the EIB bus and harmonics of the EIB signal, the low pass filter including first and second windings each having first and second terminal ends, the first terminal ends of the first and second windings coupled to the corresponding two-wire connector, the second terminal ends of the first and second windings connected to the EIB bus coupling unit, the first and second windings and the first and second terminal ends arranged for generating an electromagnetic flux, induced by any one of the EIB signal and the network signals, in a same direction.

15. The computer network of claim 14, wherein each low pass filter includes a ferrite bead toroid having wrapped thereon the first and second windings, the ferrite bead toroid configured for transporting the electromagnetic flux generated by the first and second windings in a closed loop.

16. The computer network of claim 15, wherein the ferrite bead toroid has a diameter of about 1cm.

17. The computer network of claim 14, wherein the low pass filter includes a common mode choke having the first and second windings arranged in a non-compensating configuration.

18. The computer network of claim 14, wherein the low pass filter is configured for minimizing capacitive influences encountered by the local area network signal on the EIB bus.

* * * * *